(12) United States Patent
Miyaoh

(10) Patent No.: US 6,758,479 B2
(45) Date of Patent: Jul. 6, 2004

(54) CYLINDER HEAD GASKET WITH DIFFERENT MATERIALS

(75) Inventor: Yoshio Miyaoh, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 24 days.

(21) Appl. No.: 09/985,468

(22) Filed: Nov. 2, 2001

(65) Prior Publication Data

US 2002/0170520 A1 Nov. 21, 2002

(30) Foreign Application Priority Data

Nov. 9, 2000 (JP) .................................... 2000-341798

(51) Int. Cl.[7] .............................................. F02F 11/00
(52) U.S. Cl. ..................... 277/598; 277/592; 277/593; 277/595; 277/601
(58) Field of Search .......................... 277/592–5, 600, 277/601, 598

(56) References Cited

U.S. PATENT DOCUMENTS

| | | | | |
|---|---|---|---|---|
| 3,565,449 A | * | 2/1971 | Brockhaus et al. ......... | 277/601 |
| 3,653,674 A | * | 4/1972 | Bennigsen .................. | 277/650 |
| 4,376,539 A | | 3/1983 | Baldacci | |
| 4,620,710 A | * | 11/1986 | Lambert et al. ............ | 277/596 |
| 4,728,110 A | | 3/1988 | Nakasone | |
| 4,834,399 A | * | 5/1989 | Udagawa et al. ........... | 277/592 |
| 5,082,298 A | * | 1/1992 | Uchida et al. .............. | 277/595 |
| 5,255,926 A | * | 10/1993 | Udagawa .................... | 277/595 |
| 5,306,024 A | * | 4/1994 | Udagawa .................... | 277/592 |
| 5,360,219 A | * | 11/1994 | Okuda et al. ............... | 277/592 |
| 5,378,001 A | * | 1/1995 | Miyaoh ....................... | 277/595 |
| 5,482,298 A | * | 1/1996 | Udagawa .................... | 277/600 |
| 5,522,604 A | * | 6/1996 | Weiss et al. ................ | 277/594 |
| 5,628,113 A | * | 5/1997 | Tanaka et al. ............. | 29/888.3 |
| 5,628,518 A | * | 5/1997 | Ushio et al. ................ | 277/593 |
| 5,713,580 A | * | 2/1998 | Ueta ........................... | 277/593 |
| 5,873,578 A | * | 2/1999 | Jargeaix ...................... | 277/601 |
| 5,899,462 A | * | 5/1999 | Udagawa .................... | 277/593 |
| 6,027,124 A | * | 2/2000 | Ishida et al. ................ | 277/595 |
| 6,257,591 B1 | * | 7/2001 | Abe et al. ................... | 277/591 |
| 6,322,084 B1 | * | 11/2001 | Yamada et al. ............. | 277/591 |
| 6,336,639 B1 | * | 1/2002 | Ishida et al. ................ | 277/594 |
| 6,439,579 B2 | * | 8/2002 | Uemura et al. ............. | 277/595 |
| 6,485,028 B1 | * | 11/2002 | Smith .......................... | 277/598 |

FOREIGN PATENT DOCUMENTS

EP    0 557 918    9/1993
JP    8-86360    * 4/1996

OTHER PUBLICATIONS

Patent Abstract of Japan, vol. 1998, No. 11, Sep. 30, 1998 & JP 10–176752 (Kokusan Buhin Kobyo KK), Jun. 30, 1998.

* cited by examiner

Primary Examiner—Alison K. Pickard

(57) ABSTRACT

In a cylinder head gasket, a base plate forming the gasket is formed of a first metallic material, and a grommet is provided around a hole for a cylinder bore and formed of a second metallic material different from the first metallic material. The grommet and the base plate are connected by welding. Accordingly, the grommet formed of the optimum material can be provided around the hole for the cylinder bore, and the base plate can be formed of the optimum material. Thus, the cylinder head gasket has a good sealing ability and excellent durability.

7 Claims, 4 Drawing Sheets

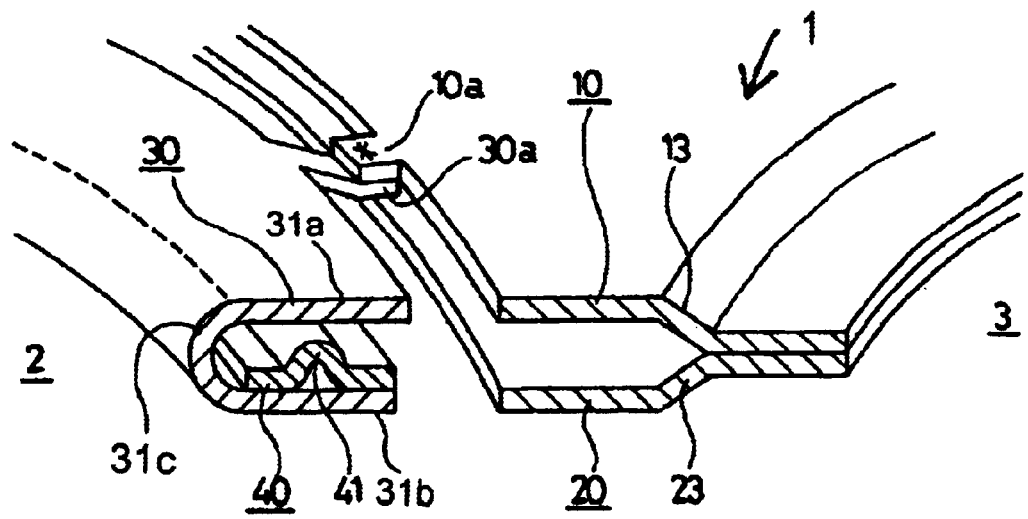
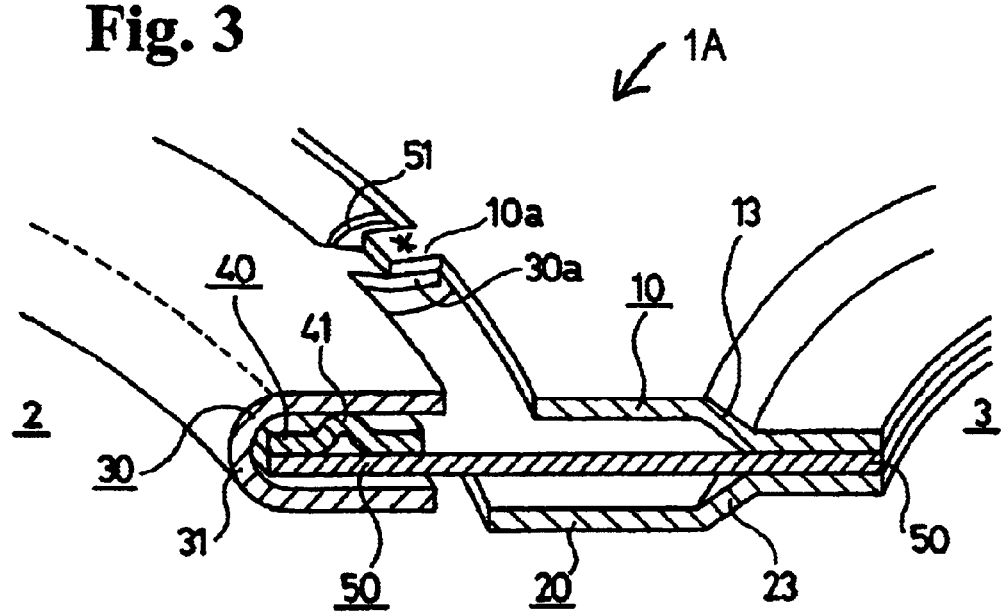

CYLINDER HEAD GASKET WITH DIFFERENT MATERIALS

BACKGROUND OF THE INVENTION AND RELATED ART STATEMENT

The present invention relates to a cylinder head gasket situated between a cylinder head and a cylinder block in an internal combustion engine to seal therebetween.

More particularly, the present invention relates to a metal cylinder head gasket provided with a grommet, in which the grommet and base plates are formed of different materials so that the cylinder head gasket has a high sealing ability and an excellent durability.

In case of sealing joining surfaces of a cylinder head and a cylinder block of an internal combustion engine, a cylinder head gasket is situated therebetween to seal combustion gas and liquid or the like.

As shown in FIG. 4, the cylinder head gasket is manufactured in accordance with shapes of engine members, such as a cylinder block and the like, and includes holes 2 for cylinder bores, liquid holes, such as water holes 3 and oil holes 4, and bolt holes 5. Also, various sealing means 31, 62 are formed for the respective holes for sealing.

In these sealing means, even though sealing is provided between the same engine members by the same gasket, required sealing abilities are extremely different depending on the holes to be sealed. Namely, while it is necessary to seal high temperature and high pressure combustion gases in the holes 2 for the cylinder bores, it is necessary to seal the relatively low temperature liquid in the liquid holes 3 and 4.

On the other hand, since it is required to reduce a weight of the engine and manufacturing cost, a type of the cylinder head gasket has been changed from a laminate type in which a large number of metal plates are laminated to a simple metal gasket, which is formed of one or two metal plates. Since the number of the constituent plates is reduced, materials which can be used for the plates are limited. Also, in order to make the engine smaller, an area which can be used for sealing means has been reduced.

Therefore, it is difficult to freely combine beads, grommets, shims or the like which can be used as sealing means, or to provide double sealing means as in the laminate type gasket in which a large number of plates are laminated. The kind and the number of sealing means are limited, so that the simplified sealing means has to be used.

Examples of conventional cylinder head gaskets are shown in FIGS. 4 to 6. In the cylinder head gasket 1X or 1Y, there is provided a single, narrow-width bead 31 in a circular arc form which can follow the change in the space well, and the bead 31 is protected by a grommet 61 formed by bending a part of a base plate 60X or 60Y so as to prevent the high temperature and high pressure combustion gas from contacting the bead 31. Also, a bead 62, or half-beads 63 and 73 are provided for sealing around the liquid holes 3 and 4.

However, in the conventional cylinder head gasket 1X or 1Y, the base plate 60X or 60Y which contacts the engine member and the grommet 61 surrounding a periphery of the hole 2 for the cylinder bore, are formed of one plate. Namely, the grommet 61 is formed of the same material as that of the base plate 60X or 60Y.

On the other hand, since the grommet 61 is formed by bending the plate, it is preferable to use an annealed material, which does not crack in the bending process and is easy to deform, as a material of the grommet 61. On the other hand, in order to provide the bead 62 or the half beads 63 and 73, it is preferable to use a spring material as the material of the base plate.

Therefore, in case the grommet and the base plate are formed of the same material, it is difficult to satisfy both characteristics in one plate. Namely, the spring ability is required for the base plate, and the bending ability and heat resistance are required for the grommet liable to have the crack in the bent portion. It is difficult to obtain enough durability in one plate.

The present invention has been made to solve the foregoing problems, and an object of the invention is to provide a cylinder head gasket with a thin-plate structure, wherein a grommet formed of an optimum material can be provided around the hole for a cylinder bore while a base plate formed of an optimum material can be provided between a cylinder head and a cylinder block, so that the cylinder head gasket has a good sealing ability and an excellent durability.

Further objects and advantages of the invention will be apparent from the following description of the invention.

SUMMARY OF THE INVENTION

To achieve the aforementioned object, the present invention provides a cylinder head gasket for sealing between a cylinder head and a cylinder block of an engine, in which a base plate forming the cylinder head gasket is formed of a first metallic material, and a peripheral member around a hole for a cylinder bore is formed of a second metallic material. The first metallic material is different from the second metallic material, and the peripheral member is connected to the base plate by welding.

According to this structure, since the peripheral member around the hole for the cylinder bore and the base plate are formed of different metallic materials, the peripheral member and the base plate can be respectively formed of suitable materials while a number of the base plates is small. Therefore, there can be obtained a light-weight cylinder head gasket with a thin-plate structure, which has a good sealing ability and an excellent durability.

Also, the present invention provides a cylinder head gasket, in which a grommet is formed around the hole for the cylinder bore, and the base plate is formed of a first metallic material. The grommet is formed of a second metallic material, which is different from the first metallic material. Also, the grommet is connected to the base plate by welding.

According to this structure, since the grommet and the base plate are formed of different metallic materials, the grommet and the base plate can be respectively formed of suitable materials. Thus, there can be obtained the cylinder head gasket which has a good sealing ability and an excellent durability.

Namely, a relatively low sealing surface pressure is sufficient in portions widely contacting engine members and portions for sealing a cooling water and a circulating oil around liquid holes, and these portions are mostly flat. Thus, it is preferable to use a material, such as spring material, having an adequate elasticity. On the other hand, around the holes for the cylinder bores, in order to seal the high pressure and high temperature combustion gas, it is necessary to have a high heat resistance, and a deformable characteristic is also required for the bending process. Thus, it is preferable to use a material, such as annealed material, which is excellent in the heat resistance and bending characteristic. By adopting the above structure of the invention, both the demands described above can be easily achieved.

Further, in the cylinder head gasket as stated above, the first metallic material forming the base plate is formed of a spring material, and the second metallic material forming the grommet is formed of an annealed material. The first metallic material forming the base plate can be a stainless steel plate, a spring material plate or the like, and the second metallic material forming the base plate forming the grommet can be an annealed stainless steel plate, a soft steel plate or the like. A combination of the spring plate and the annealed stainless steel plate is most preferable.

In the cylinder head gasket as stated above, spot welding portions are respectively formed in the base plate and the grommet, and spot weldings are applied at portions where the welding portions of the base plates and the grommet are overlapped, so that the grommet is integrally connected to the base plate.

According to this structure, since the grommet and the base plate are connected at the spot welding portions by welding, the portions where the grommet and the base plate are overlapped can be extremely small, so that a weight of the cylinder head gasket can be reduced and a material thereof can be saved.

In this case, it may be structured such that the end portions of the grommet and end portions of the base plate are overlapped in the circumferential areas, and the spot weldings are applied at several points of the overlapped portions. Alternatively, as in the cylinder head gasket used in a cylinder block of an open deck type, a space may be formed between the end portion of the grommet and the end portion of the base plate to obtain a passage for cooling water in a water jacket, and the overlapped portions are formed by the spot welding portions.

Incidentally, although a space between the grommet and the base plate can be welded throughout an entire periphery thereof, it is sufficient to handle the grommet and the base plate as an integral cylinder head gasket. Therefore, in view of reducing a number of working steps and weight of the gasket, it is preferable to connect the grommet and the base plate at the several points by spot welding.

Further, in the cylinder head gasket as stated above, a bead member may be disposed inside the grommet. According to this structure, the bead can be provided in the grommet, and by the elasticity of the bead, the excellent sealing ability can be exhibited. A material of the bead member can be a metallic material which is different from the metallic material of the base plate, or even if the material of the bead member is the same metallic material as that of the base plate, a thickness of the bead or heat history thereof can be changed.

Incidentally, although the aforementioned structures of the invention are especially effective in case a number of the base plate of the metal gasket is two, the same effects can be achieved even if the number of the base plate is one, or more than two including an intermediate plate. Also, a sectional shape and a size of the bead, and the material of the bead member can be adequately selected depending on the required sealing ability.

BRIEF DESCRIPTION OF THE DRAWINGS

FIG. 2 is a partly sectional, perspective view schematically showing the cylinder head gasket of the first embodiment, taken along line 2,3—2,3 in FIG. 1;

FIG. 3 is a partly sectional, perspective view schematically showing the cylinder head gasket of the second embodiment, taken along line 2,3—2,3 in FIG. 1;

DETAILED DESCRIPTION OF THE PREFERRED EMBODIMENT

Hereunder, specific embodiments of a cylinder head gasket of the invention will be explained with reference to the drawings.

Figure 1:
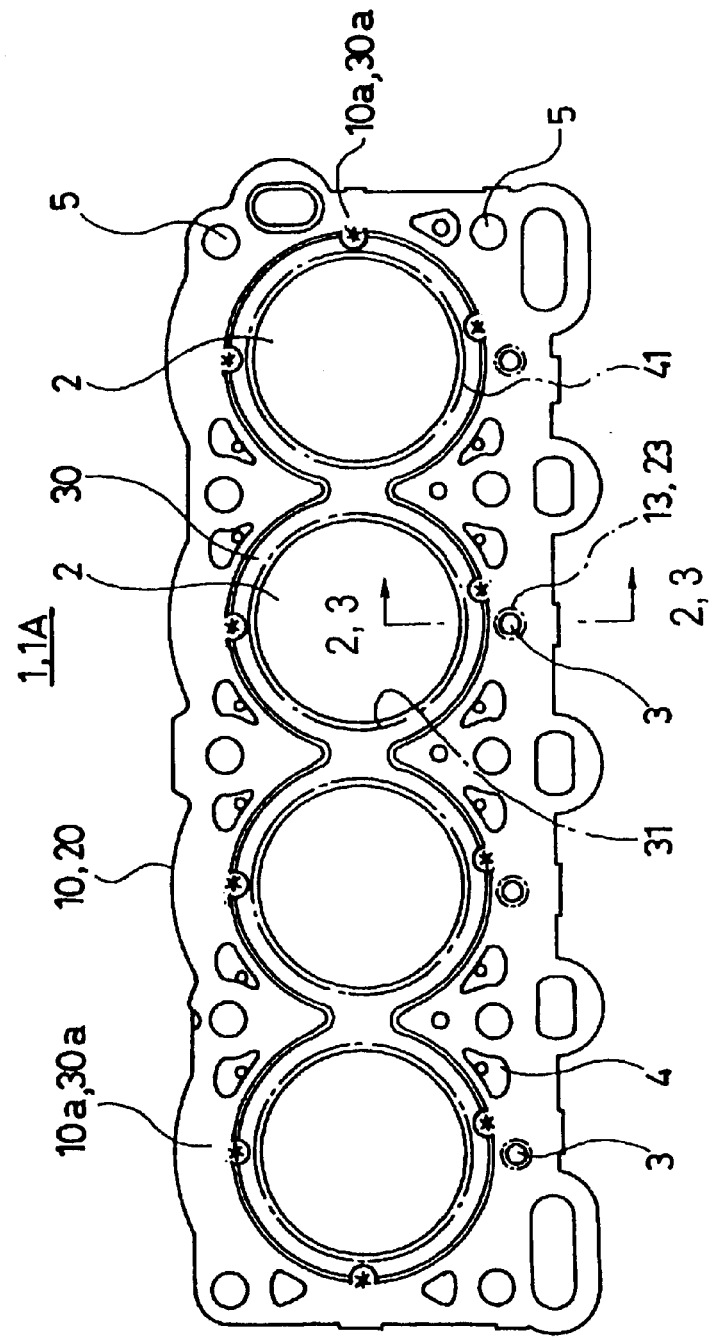
FIG. 1 is a plan view showing a cylinder head gasket according to first and second embodiments of the invention.
Figure 4:
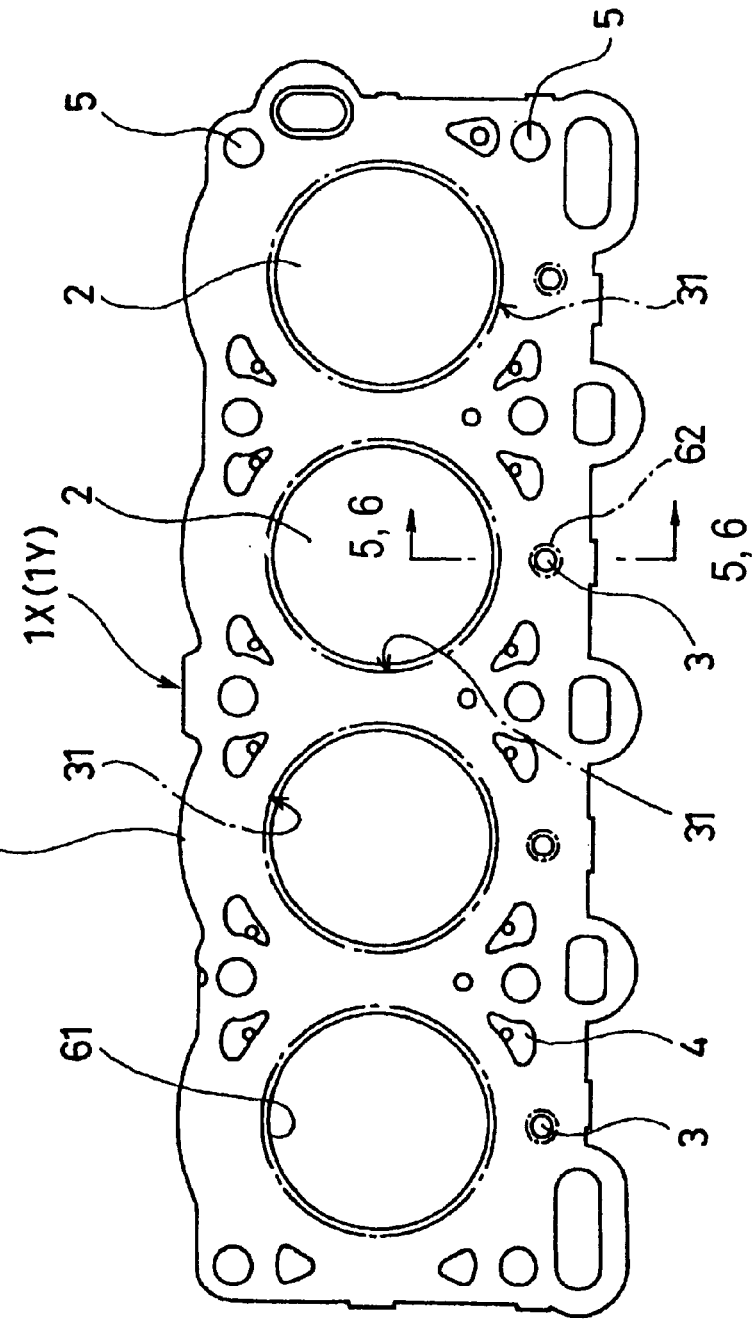
FIG. 4 is a plan view showing a conventional cylinder head gasket.
Figure 5:
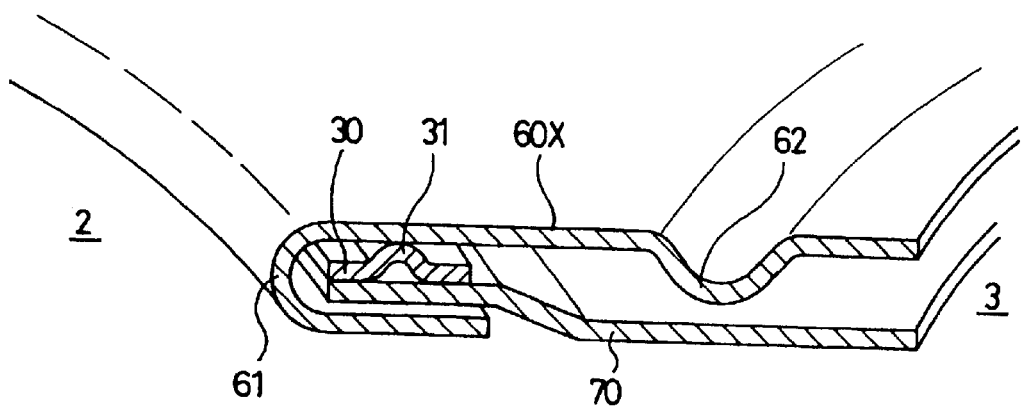
FIG. 5 is a partly sectional, perspective view schematically showing the conventional cylinder head gasket, taken along line 5,6—5,6 in FIG. 4.
Figure 6:
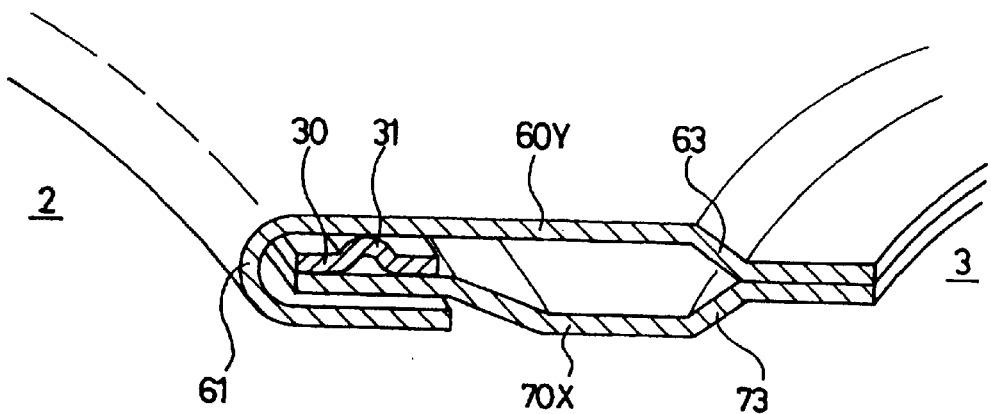
FIG. 6 is a partly sectional, perspective view schematically showing another conventional cylinder head gasket, taken along line 5,6—5,6 in FIG. 4.

As shown in FIG. 1 showing a plan view of a cylinder head gasket 1 or 1A, the cylinder head gasket 1 or 1A of the embodiment is a metal gasket to be situated between a cylinder head and a cylinder block (cylinder body) of an engine, and seals high temperature and high pressure combustion gas in the cylinder bores, and liquids, such as cooling water and oil, in the liquid passages, such as a cooling water passage and an oil passage.

Incidentally, FIGS. 1 to 6 are schematic explanatory views, and the thickness of the metal gasket, sizes of the bead and the sealing groove, and aspect ratios thereof are different from actual ones. The sealing portions are shown with emphasis for better understanding of the present invention.

As shown in FIGS. 1 and 2, the cylinder head gasket 1 of the first embodiment of the invention is formed of base plates 10 and 20 as two constituent plates, a grommet 30 provided around the hole 2 for the cylinder bore as a peripheral member, and a bead plate 40.

A first metallic material forming the base plates or metal plates 10 and 20 of the cylinder head gasket 1 is formed of a spring material, such as stainless steel plate and spring steel plate, and a second metallic material forming the grommet 30 is formed of an annealed stainless plate, a soft steel plate, or the like. Also, a metallic material forming the bead plate 40 having a bead 41 may be formed of the same material as that of the base plate 10, or can be formed of a third metallic material which is different from the first and second metallic materials.

Incidentally, as an example of the thicknesses of the plates, in case the diameter of the cylinder bore is 80 mm, the thickness of each of the base plates 10 and 20 is 0.2–1.0 mm; the thickness of the grommet 30 is 0.2–0.3 mm; and the thickness of the bead plate 40 is 0.2–0.4 mm.

The grommet 30 has an upper portion 31a, a lower portion 31b and a curved portion 31c. The hole 2 for the cylinder bore is defined by the curved portion 31c in a shape of a connected ring, and spot welding portions 30a are formed at two or three places of the upper portion 31a around the hole 2 for the cylinder bore.

Also, in the grommet member, the bead plate 40 in an annular form is provided to surround the hole 2 for the cylinder bore, and a middle portion of the grommet member is bent to form the grommet 30 covering the bead plate 40.

On the other hand, the base plate 10 is provided with spot welding portions 10a to be overlapped with the spot welding portions 30a of the grommet 30, and half beads 13 for sealing the liquid holes 3 and 4. Also, the base plate 20 is provided with half beads 23 for sealing the liquid holes 3 and 4.

The spot welding portions 10a of the base plate 10 are overlapped with the spot welding portions 30a of the grommet 30, and spot weldings are applied thereto, so that the base plate 10 and the grommet 30 are integrally connected. Also, the base plate 10 and the base plate 20 are connected by spot welding, an adhesive or the like. Accordingly, the cylinder head gasket 1 as shown in FIGS. 1 and 2 can be formed.

According to the cylinder head gasket 1 of the above structure, since the first metallic material forming the base plates 10 and 20 is formed of a metallic material different from the second metallic material forming the grommet 30, the grommet 30 and the base plates 10 and 20 can be formed of respectively optimum materials. Thus, there can be obtained the cylinder head gasket 1 which has the good sealing ability and the excellent durability.

Also, since the base plate 10 and the grommet 30 are connected by the weldings at the overlapped spot welding portions 10a and 30a, the overlapped portions 10a and 30a between the base plate 10 and the grommet 30 are very small, so that the weight of the cylinder head gasket 1 can be reduced and a material therefor can be saved. Further, since the bead plate 40 is disposed inside the grommet 30, the excellent sealing ability can be exhibited due to the elasticity of the bead 41.

Next, the cylinder head gasket 1A of the second embodiment shown FIG. 1 and FIG. 3 will be explained. The cylinder head gasket 1A is different from the cylinder head gasket 1 of the first embodiment in that an intermediate plate 50 functioning as a thickness adjustment plate is additionally provided, and the other structures of the second embodiment are the same as those of the first embodiment.

The intermediate plate 50 is provided with adjustment holes 51 located at portions where the spot welding portions 30a and 10a are overlapped.

According to the cylinder head gasket 1A structured as described above, since the intermediate plate 50 for adjusting the thickness is provided, a sealing surface pressure of the bead 41 and sealing surface pressures of the half beads 13 and 23 can be adjusted to be optimum, so that the sealing ability can be extremely improved.

Also, when the cylinder head gasket 1A is situated between the engine members, the portions where the spot welding portions 30a and 10a are overlapped can be accommodated in the adjusting holes 51, so as to have substantially the same thickness as a whole.

As described above, in the cylinder head gasket of the invention, the first metallic material forming the base plate is formed of the metallic material different from the second metallic material forming the grommet, so that the base plate and the grommet can be formed of respectively optimum metallic materials. Accordingly, there can be obtained the cylinder head gasket having the good sealing ability and excellent durability.

Namely, in the portions widely contacting the engine members or in the portions for sealing the cooling water or the circulating oil around the liquid holes, it is possible to use the material having adequate elasticity, such as spring material. In the grommet, in order to seal the high pressure and high temperature combustion gas, there can be used a material, such as annealed material, which has a high heat resistance and is easily deformed in the bending process.

Also, the spot welding portions or margins are provided respectively in the base plate and the grommet, and the base plate and the grommet are integrally connected by welding at portions where the spot welding portions are overlapped. Therefore, the portions where the base plate and the grommet are overlapped become extremely small, so that the weight of the cylinder head gasket can be reduced and a material thereof can be saved.

While the invention has been explained with reference to the specific embodiments of the invention, the explanation is illustrative and the invention is limited only by the appended claims.

What is claimed is:

1. A cylinder head gasket for an internal combustion engine having a cylinder head and a cylinder block, comprising:

a first metal plate extending substantially throughout an entire area to be sealed and having a first hole corresponding to the cylinder bore, a second hole for the fluid hole, and a plurality of first connecting portions extending toward the first hole from an edge thereof, said first metal plate being formed of a spring material, a grommet situated in the first hole to have a space with respect to the first metal plate, said grommet defining a third hole for the cylinder bore and formed of a second metal plate made of an annealed material different from the first metal plate, said grommet having an upper portion, a lower portion, a curved portion formed between the upper and lower portions to define the third hole, and a plurality of second connecting portions extending outwardly from the upper portion of the grommet, said second connecting portions being connected to the first connecting portions, and a third metal plate piled with the first metal plate to constitute a base together with the first metal plate.

2. A cylinder head gasket according to claim 1, wherein said first and second connection portions are overlapped with each other and connected by spot welding.

3. A cylinder head gasket according to claim 1, further comprising a bead member provided inside the grommet.

4. A cylinder head gasket according to claim 1, wherein said first and third metal plates have half beads around the second hole to seal around the fluid hole.

5. A cylinder head gasket according to claim 4, further comprising a fourth metal plate situated between the first and third metal plates and extending inwardly into the first hole to be held in the grommet.

6. A cylinder head gasket according to claim 4, further comprising an annular bead member provided inside the grommet, said gasket consisting essentially of said first and third metal plates laminated together, said grommet and said bead member.

7. A cylinder head gasket according to claim 4, wherein said first and third metal plates are piled so that portions around the second hole directly contact with each other, and portions outside the portions directly contacting with each other are spaced apart from each other.

* * * * *